United States Patent
Foerch

(10) Patent No.: US 11,201,525 B2
(45) Date of Patent: Dec. 14, 2021

(54) MOTOR AND PUMP ASSEMBLY FOR A BRAKE SYSTEM

(71) Applicant: Robert Bosch GmbH, Stuttgart (DE)

(72) Inventor: Dirk Foerch, Stein (DE)

(73) Assignee: Robert Bosch GmbH, Stuttgart (DE)

( * ) Notice: Subject to any disclaimer, the term of this patent is extended or adjusted under 35 U.S.C. 154(b) by 639 days.

(21) Appl. No.: 15/542,288

(22) PCT Filed: Dec. 29, 2015

(86) PCT No.: PCT/EP2015/081321
§ 371 (c)(1),
(2) Date: Jul. 7, 2017

(87) PCT Pub. No.: WO2016/119987
PCT Pub. Date: Aug. 4, 2016

(65) Prior Publication Data
US 2018/0269751 A1 Sep. 20, 2018

(30) Foreign Application Priority Data
Jan. 28, 2015 (DE) ............. 10 2015 201 411.8

(51) Int. Cl.
*H02K 11/215* (2016.01)
*F04B 17/03* (2006.01)
(Continued)

(52) U.S. Cl.
CPC ............ *H02K 11/215* (2016.01); *B60T 13/20* (2013.01); *B60T 17/22* (2013.01); *F04B 17/03* (2013.01);
(Continued)

(58) Field of Classification Search
CPC .................. F04B 49/20; F04B 49/103; F04B 2201/1201; F04B 2201/1208; F04B 17/03;
(Continued)

(56) References Cited

U.S. PATENT DOCUMENTS

| 4,462,491 A * | 7/1984 | Kono ................... B60H 1/3225 192/103 R |
| 4,924,674 A * | 5/1990 | Hara ...................... F01D 15/10 322/31 |

(Continued)

FOREIGN PATENT DOCUMENTS

| CN | 102645547 A | 8/2012 |
| DE | 197 33 147 C1 | 11/1998 |

(Continued)

OTHER PUBLICATIONS

DE102011079657 English Translation, from EPO website, created Jul. 17, 2020. (Year: 2020).*
(Continued)

*Primary Examiner* — Bryan M Lettman
(74) *Attorney, Agent, or Firm* — Maginot, Moore & Beck LLP

(57) ABSTRACT

A motor/pump assembly for a brake system includes at least one fluid pump arranged in a pump housing, an electric motor having a motor shaft configured to drive the fluid pump, a control unit arranged on the pump housing and configured to set a current rotational speed and/or a current torque of the motor, and a sensor arrangement having a measured value transmitter arranged within the pump housing and a magnetic measured value pickup stationarily arranged in the control unit. The control unit is further configured to detect contactlessly a current rotational angle of the shaft via the sensor arrangement, and to evaluate the angle to control the motor. The transmitter, in accordance (Continued)

with a rotary motion of the shaft, is configured to influence at least one magnetic variable of a magnetic field detected by the pickup.

9 Claims, 3 Drawing Sheets

(51) Int. Cl.
*H02K 11/30* (2016.01)
*B60T 13/20* (2006.01)
*B60T 17/22* (2006.01)

(52) U.S. Cl.
CPC ...... *H02K 11/30* (2016.01); *F04B 2201/1208* (2013.01); *F04B 2203/0207* (2013.01); *F04B 2203/0209* (2013.01)

(58) Field of Classification Search
CPC ...... F04B 2203/0207; F04B 2203/0209; F04B 9/04–9/045; H02K 11/215; H02K 11/30; B60T 13/20; B60T 17/22
See application file for complete search history.

(56) References Cited

U.S. PATENT DOCUMENTS

| | | |
|---|---|---|
| 2001/0043864 A1 | 11/2001 | Maruyama et al. |
| 2004/0075339 A1* | 4/2004 | Volz ................ B60T 8/368 303/116.4 |
| 2011/0181221 A1 | 7/2011 | Asahi et al. |
| 2014/0260233 A1 | 9/2014 | Giovanardi et al. |
| 2014/0265169 A1 | 9/2014 | Giovanardi et al. |
| 2014/0294625 A1* | 10/2014 | Tucker ................ H02K 5/12 417/410.1 |

FOREIGN PATENT DOCUMENTS

| | | |
|---|---|---|
| DE | 10 2005 012 250 A1 | 9/2006 |
| DE | 601 23 581 T2 | 6/2007 |
| DE | 10 2011 017 011 A1 | 11/2011 |
| DE | 10 2011 079 657 A1 | 1/2013 |
| DE | 102011079657 * | 1/2013 |
| DE | 10 2012 109 863 A1 | 4/2013 |
| JP | 7-55415 A | 3/1995 |
| JP | 2000-65596 A | 3/2000 |
| JP | 2002-176757 A | 6/2002 |
| JP | 2002-310609 A | 10/2002 |
| JP | 2003-70203 A | 3/2003 |
| JP | 2007-028811 A | 2/2007 |
| JP | 2007-28811 A | 2/2007 |
| JP | 2007-292511 A | 11/2007 |
| WO | 02/060734 A1 | 8/2002 |

OTHER PUBLICATIONS

International Search Report corresponding to PCT Application No. PCT/EP2015/081321, dated Mar. 21, 2016 (German and English language document) (7 pages).

Lu, Lizhong et al., "Electronic Circuits and Systems," National Defense Industry Press, Mar. 31, 2013, p. 265.

Chiang, Jun, "Drilling and Logging Instruments (vol. 1)," Jianghan Institute of Petroleum, Dec. 31, 1985, pp. 45-47.

* cited by examiner

MOTOR AND PUMP ASSEMBLY FOR A BRAKE SYSTEM

This application is a 35 U.S.C. § 371 National Stage Application of PCT/EP2015/081321, filed on Dec. 29, 2015, which claims the benefit of priority to Serial No. DE 10 2015 201 411.8, filed on Jan. 28, 2015 in Germany, the disclosures of which are incorporated herein by reference in their entirety.

The disclosure starts from a motor and pump assembly for a brake system.

BACKGROUND

In known brake systems with ESP and/or ABS functionality (ESP: Electronic Stability Program, ABS: Antilock Brake System), a DC motor is usually used to operate two hydraulic pumps for brake fluid delivery by way of an eccentric. In general, these are rotational speed-controlled or fully driven DC motors. Here, the rotational speed is detected by means of the generated voltage induced by the motor itself in the nonpowered phase of the drive system.

DE 197 33 147 C1, for example, discloses a motor and pump assembly for a motor vehicle brake system with ABS functionality. The motor and pump assembly comprises an electric motor, which comprises a motor shaft, the free end of which is embodied as an eccentric output shaft, which drives two radially opposite pump plungers arranged in a pump housing.

SUMMARY

In contrast, the motor and pump assembly according to the disclosure for a brake system, having the features disclosed herein, has the advantage that, in addition to the available rotational speed information, the actual position of the motor armature or of the motor shaft can be detected without having to route additional electric leads to the motor. This rotational angle information can be used especially in the case of electronically commutated DC motors.

Embodiments of the motor and pump assembly according to the disclosure advantageously use the specific fundamental construction of the motor and pump assembly, in which the electric motor and the control unit are each flanged to the pump housing. In order to avoid expensive additional leads in the interior of the electric motor, only a small change is made to the motor shaft and in the control unit in order to detect rotational angle information. The rotational angle information is detected by means of magnetic field lines, which change with the position of the armature or of the motor shaft. The effect on the magnetic field lines is detected by the sensor, evaluated and converted into rotational angle information or rotational speed information. Here, the conversion can be carried out by a separate evaluation and control unit or by a unit integrated into the measured value pickup.

Embodiments of the present disclosure make available a motor and pump assembly for a brake system having an electric motor, which has a motor shaft that drives at least one fluid pump, which is arranged in a pump housing. According to the disclosure, a control unit is arranged on the pump housing and sets a current rotational speed and/or a current torque of the electric motor. In this case, the control unit contactlessly detects a current rotational angle of the motor shaft by means of a sensor arrangement, which comprises a measured value transmitter and a magnetic measured value pickup, and evaluates it for control of the electric motor. The measured value transmitter is arranged within the pump housing at a free end of the motor shaft and, in accordance with the rotary motion of the motor shaft, influences at least one magnetic variable of a magnetic field detected by the magnetic measured value pickup, which is arranged in a stationary manner in the control unit.

The fluid pump can be embodied as a piston pump or as a gear pump, for example.

By means of the measures and developments presented herein, advantageous improvements of the motor and pump assembly for a brake system are possible.

It is particularly advantageous that the magnetic measured value pickup can have a permanent magnet, which can produce the magnetic field detected by the magnetic measured value pickup. The magnetization axis of the permanent magnet can preferably be parallel to the axis of the motor shaft. To influence the magnetic field of the permanent magnet, the measured value transmitter is embodied as a geometrical shape, which changes the "air gap" between the permanent magnet and the free end of the motor shaft due to the rotary motion of the motor shaft, with the result that the field strength or magnetic flux between the permanent magnet and the motor shaft likewise changes. This change can be detected by the magnetic measured value pickup, i.e. by the measured value pickup which responds to the changes in the magnetic field. The geometrical shape can be embodied as a blade, which extends perpendicularly to the axis of the motor shaft at the free end of the motor shaft. As an alternative, the geometrical shape can be embodied as a pin arranged eccentrically at the free end of the motor shaft. The geometrical shape embodied as a pin produces in the measured value pickup a sine signal, the fundamental frequency of which corresponds to the rotational speed of the motor shaft.

In an alternative embodiment of the motor and pump assembly according to the disclosure, the measured value transmitter can be embodied as a permanent magnet, which produces the magnetic field detected by the magnetic measured value pickup. The permanent magnet is mounted on the motor shaft during the production of the motor and is preferably magnetized just a short time before the installation of the electric motor. It is thereby advantageously possible to prevent chips from collecting on the magnet along the transfer path. The magnetization axis of the permanent magnet can be perpendicular to the axis of the motor shaft. The measured value pickup detects the rotational position of the motor shaft from the alignment of the magnetic field.

In another advantageous embodiment of the motor and pump assembly according to the disclosure, the magnetic measured value pickup can have a Hall effect sensor for detecting the changes in the magnetic field. Hall effect sensors can advantageously be procured or produced in large numbers at low cost.

In another advantageous embodiment of the motor and pump assembly according to the disclosure, a housing of the control unit can be flanged to the pump housing.

Illustrative embodiments of the disclosure are shown in the drawings and are explained in greater detail in the following description. In the drawings, identical reference signs denote components or elements which perform identical or similar functions.

DETAILED DESCRIPTION

Figure 1:
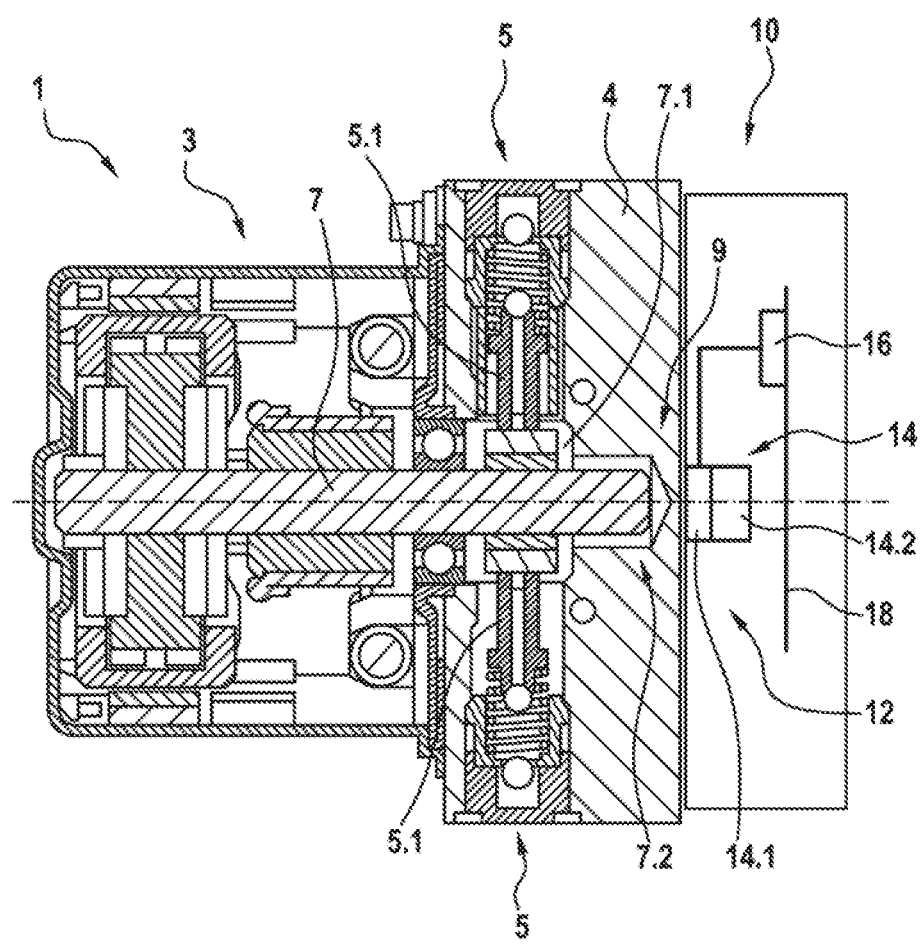
FIG. 1 shows a schematic section through a first illustrative embodiment of a motor and pump assembly according to the disclosure for a brake system.
Figure 2:
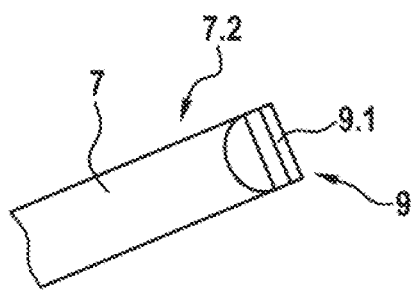
FIG. 2 shows a schematic perspective illustration of the free end of a motor shaft of the motor and pump assembly for a brake system from FIG. 1.

As can be seen from FIGS. 1 to 5, the illustrated illustrative embodiments of a motor and pump assembly 1, 1A according to the disclosure for a brake system each comprise an electric motor 3, which has a motor shaft 7, 7A that drives at least one fluid pump 5. The at least one fluid pump 5 is arranged in a pump housing 4. According to the disclosure, a control unit 10, 10A is arranged on the pump housing 4 and sets a current rotational speed and/or a current torque of the electric motor 3. Here, the control unit 10, 10A contactlessly detects a current rotational angle of the motor shaft 7, 7A by means of a sensor arrangement 12, 12A, which comprises a measured value transmitter 9, 9A and a magnetic measured value pickup 14, 14A, and evaluates it for control of the electric motor 3. The measured value transmitter 9, 9A is arranged within the pump housing 4 at a free end 7.2, 7.2A of the motor shaft 7, 7A and, in accordance with the rotary motion of the motor shaft 7, 7A, influences at least one magnetic variable of a magnetic field detected by the magnetic measured value pickup 14, 14A, which is arranged in a stationary manner in the control unit 10, 10A. The rotational angle information is thus detected by means of magnetic field lines which change with the position of the motor shaft 7, 7A or of the armature of the electric motor 3, which is connected to the motor shaft 7, 7A.

Figure 5:
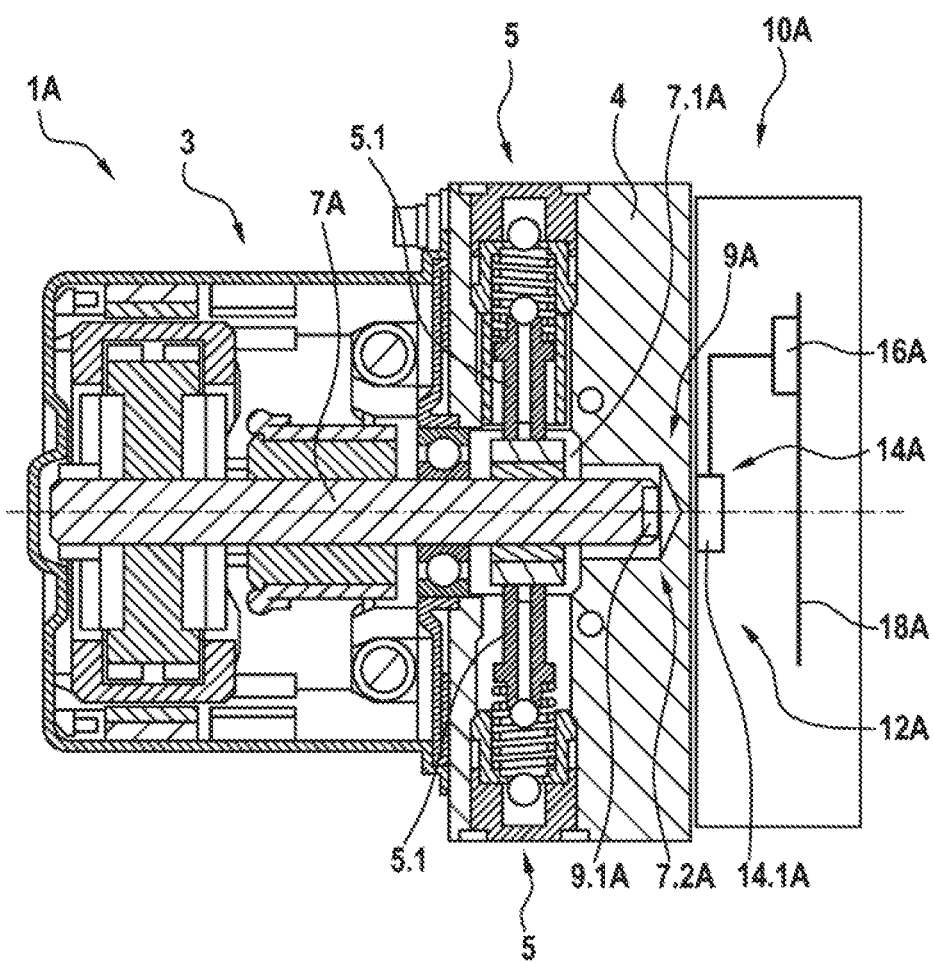
FIG. 5 shows a schematic section through a second illustrative embodiment of a motor and pump assembly according to the disclosure for a brake system.

As can furthermore be seen from FIGS. 1 and 5, the motor shaft 7, 7A is the moving component of the electric motor 3 which is closest to the control unit 10, 10A. The effect on the magnetic field is detected by the magnetic measured value pickup 14, 14A, evaluated and converted into a rotational angle signal or a rotational speed signal. In each of the illustrative embodiments shown, the magnetic measured value pickup 14, 14A comprises a Hall effect sensor 14.1, 14.1A, which detects the changes in the magnetic field. Conversion can be performed by an evaluation and control unit 16, 16A, for example, which is arranged on a corresponding circuit board 18, 18A within the control unit 10, 10A and is connected electrically to the measured value pickup 14, 14A. In an alternative illustrative embodiment (not shown), the Hall effect sensor 14, 14.1 can be integrated into the housing of an integrated circuit which performs the evaluation and conversion.

As can furthermore be seen from FIGS. 1 and 5, the motor and pump assembly 1, 1A according to the disclosure in each of the illustrative embodiments shown comprises two fluid pumps 5 embodied as piston pumps, which each have an axially movable pump piston 5.1. To drive the pump pistons 5.1, an eccentric 7.1, 7.1A is arranged on the motor shaft 7, 7A, against which eccentric the pump pistons 5.1 rest. The two fluid pumps 5 of the motor and pump assembly 1, 1A according to the disclosure are arranged in corresponding mutually radially opposite location holes in the pump housing 4. In the illustration in FIGS. 1 and 5, the two pump pistons 5.1 are driven with a reciprocating motion by the rotary motion of the motor shaft 7, 7A via the eccentric 7.1, 7.1A. Moreover, the housing of the control unit 10, 10A and the electric motor 3 are each flanged to the pump housing 4. The pump housing 4 is therefore situated as a hermetic seal between the electric motor 3 and the control unit 10, 10A. The measurement of the rotational angle of the motor shaft 3 thus takes place through the wall of the pump housing 4, which is preferably embodied as an aluminum housing.

In an alternative illustrative embodiment (not shown) of the disclosure, the fluid pumps 5 are each embodied as gear pumps, which are driven by the motor shaft 7, 7A.

As can furthermore be seen from FIGS. 1 to 4, the magnetic measured value pickup 14 in the first illustrative embodiment of the motor and pump assembly 1 according to the disclosure for a brake system has a permanent magnet 14.2, which produces the magnetic field detected by the magnetic measured value pickup 14. As can furthermore be seen from FIG. 1, the Hall effect sensor 14.1 of the measured value pickup 14 is arranged between the permanent magnet 14 and the measured value transmitter 9 at the free end 7.2 of the motor shaft 7. The measured value transmitter 9 is embodied as a geometrical shape 9.1 which influences the magnetic field of the permanent magnet 14.2. The magnetization axis of the permanent magnet 14.2 advantageously extends parallel to the axis of the motor shaft 7.

Figure 3:
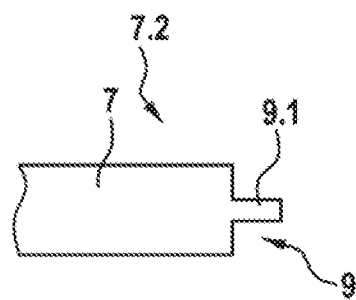
FIG. 3 shows a section through the free end of the motor shaft from FIG. 2 in a first position.
Figure 4:
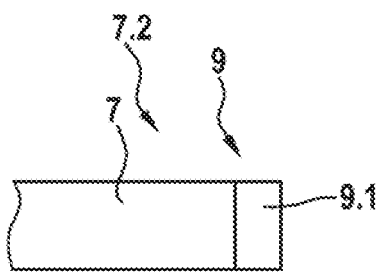
FIG. 4 shows a section through the free end of the motor shaft from FIG. 2 in a second position.

As can furthermore be seen from FIGS. 1 to 4, the geometrical shape 9.1 of the measured value transmitter 9 in the first illustrative embodiment shown is embodied as a blade, which extends perpendicularly to the axis of the motor shaft 7 at the free end of the motor shaft 7. In this case, FIG. 3 shows a first position of the motor shaft 7, which represents a rotational angle of 0°. FIG. 4 shows a second position of the motor shaft 7, which represents a rotational angle of 90°. In an alternative illustrative embodiment (not shown), the geometrical shape 9.1 can be embodied as a pin arranged eccentrically at the free end of the motor shaft 7.

As can furthermore be seen from FIG. 5, the measured value transmitter 9A in the illustrated second illustrative embodiment of the motor pump assembly 1A according to the disclosure is embodied as a permanent magnet 9.1A, which produces the magnetic field detected by the magnetic measured value pickup 14A. In this case, the magnetization axis of the permanent magnet 9.1A is perpendicular to the axis of the motor shaft 7A. The Hall effect sensor 14.1A of the measured value pickup 14A detects the rotational position of the motor shaft 7A from the alignment of the corresponding magnetic field produced by the permanent magnet 9.1A. The permanent magnet 9.1A is mounted on the motor shaft 7A during production of the motor and is magnetized just before the installation of the electric motor 3. It is thereby advantageously possible to prevent chips from collecting on the magnet 9.1A along the transfer path.

Embodiments of the present disclosure make available a motor and pump assembly for a brake system, in which the rotational angle information on the corresponding electric motor is advantageously detected without an additional electrical connection to the electric motor. Here, transmission of the information on the angle is accomplished exclusively by means of the change in magnetic field lines, which is dependent on the position of the motor shaft. The magnetic change is preferably detected by means of Hall effect sensors at the free end of the motor shaft.

The invention claimed is:

1. A motor and pump assembly for a brake system, comprising:
   an electric motor including a motor shaft configured to drive at least one fluid pump, the at least one fluid pump arranged in a pump housing;

a control unit arranged on the pump housing and configured to set at least one of a current rotational speed and a current torque of the electric motor; and a sensor arrangement including a measured value transmitter arranged within the pump housing at a free end of the motor shaft, and a magnetic measured value pickup stationarily arranged within the control unit, wherein the control unit is further configured to detect contactlessly a current rotational angle of the motor shaft via the sensor arrangement, and to evaluate the current rotational angle in order to control the electric motor, wherein the measured value transmitter, in accordance with a rotary motion of the motor shaft, is configured to influence at least one magnetic variable of a magnetic field detected by the magnetic measured value pickup, wherein the magnetic measured value pickup includes a permanent magnet that produces the magnetic field detected by the magnetic measured value pickup, wherein the measured value transmitter is the free end of the motor shaft formed into a geometrical shape and configured to influence the magnetic field of the permanent magnet, wherein the geometrical shape is a blade that extends across the axis of the motor shaft at the free end of the motor shaft, and wherein the measured value transmitter and the motor shaft are a single piece of the same material.

2. The motor and pump assembly as claimed in claim 1, wherein a magnetization axis of the permanent magnet is parallel to an axis of the motor shaft.

3. The motor and pump assembly as claimed in claim 1, wherein the magnetic measured value pickup is a Hall effect sensor.

4. The motor and pump assembly as claimed in claim 1, wherein the control unit includes a housing that is flanged to the pump housing.

5. The motor and pump assembly as claimed in claim 1, wherein a width of the blade is equal to a diameter of the motor shaft.

6. The motor and pump assembly as claimed in claim 1, wherein:
the rotary motion of the motor shaft is configured to change an air gap between the measured value transmitter and the measured value pickup, and the change in the air gap changes a magnetic field strength of the magnetic field detected by the measured value pickup.

7. A motor and pump assembly, comprising:
an electric motor including a motor shaft configured to drive at least one fluid pump, the at least one fluid pump arranged in a pump housing;

a control unit arranged on the pump housing and configured to set at least one of a current rotational speed and a current torque of the electric motor; and a sensor arrangement including a measured value transmitter arranged within the pump housing at a free end of the motor shaft, and a magnetic measured value pickup stationarily arranged within the control unit, wherein the control unit is further configured to detect contactlessly a current rotational angle of the motor shaft via the sensor arrangement, and to evaluate the current rotational angle in order to control the electric motor, wherein the measured value transmitter, in accordance with a rotary motion of the motor shaft, is configured to influence at least one magnetic variable of a magnetic field detected by the magnetic measured value pickup, wherein the magnetic measured value pickup includes a permanent magnet that produces the magnetic field detected by the magnetic measured value pickup, wherein the measured value transmitter is the free end of the motor shaft formed into a geometrical shape and configured to influence the magnetic field of the permanent magnet, wherein the geometrical shape is a blade that extends across the axis of the motor shaft at the free end of the motor shaft, and wherein a continuous portion of the pump housing is (i) positioned between the measured value transmitter and the magnetic measured value pickup, and (ii) extends to a radially peripheral edge of the pump housing with respect to the axis of the motor shaft.

8. The motor and pump assembly as claimed in claim 7, wherein the axis of the motor shaft extends through the continuous portion of the pump housing.

9. The motor and pump assembly as claimed in claim 7, wherein the continuous portion is formed from only one material.

* * * * *